United States Patent Office 3,143,433
Patented Aug. 4, 1964

3,143,433
CERAMIC STRUCTURAL PRODUCTS
William H. Blair, 3936 Bryn Mawr Drive, Dallas, Tex.
No Drawing. Filed Sept. 14, 1959, Ser. No. 839,565
2 Claims. (Cl. 106—71)

This invention relates to ceramic structural products. More particularly, it pertains to a colored lightweight brick or block which advantageously utilizes native clays or shales combined in various proportions and in which there is produced homogeneously throughout the article any desired combination of colors.

A variety of multi-colored tiles and bricks have heretofore been proposed. Among these has been a product made from red or brown bloated shale. However, the color of the finished product has been that of the natural constituents; and where a color other than that of the natural constituents has been desired, it has been necessary to add an exterior surface coating of either engobe or glaze.

The subject matter of this invention advantageously eliminates the necessity for the aforementioned engobe or glaze, for through its practice, any desired color pattern may be imparted to the ceramic product. Moreover, the color pattern is embodied homogeneously throughout the product, and as a consequence, chipping or breakage does not destroy or substantially change the color appearance.

It is one general object of this invention to improve ceramic products and the methods for producing same.

It is another object of this invention to improve and widen the choice of color in ceramic structural products.

It is still another object of this invention to simplify manufacture of multi-colored ceramic lightweight structural products.

It is yet another object of this invention to improve (i.e., lower) the water absorption characteristics of ceramic structural products, thereby rendering them more valuable in building construction, contributing to structural permanency, and eliminating or greatly reducing unsightly water staining.

It is still a further object of this invention to provide a ceramic structural element in which the coloring of an aggregate coating may be displayed in endless numbers of color combinations.

It is yet one additional object of this invention to provide in a colored ceramic product an extremely lightweight characteristic together with an excellent insulating property.

It is still one additional object of this invention to produce a lightweight colorable ceramic product suitable for "through-the-wall" construction in which the ceramic product is itself sufficiently pleasing in appearance, both inside and out, to eliminate the necessity for interior or exterior covering or modification.

In accordance with one feature of the invention, several differently-coated aggregates may be mixed together, thereby resulting in a multi-colored mottled appearance.

In accordance with a further feature of the invention, the aggregate coating is formulated to impart the desired strength to the ceramic product, when fired, and, in addition, to substantially minimize undesired water absorption characteristics.

Other objects and features will be apparent from the following detailed description, by way of example in which advantageous processes and products are set forth.

Now turning more particularly to the invention, in accordance with one embodiment thereof, bloated shale or clay may be selected and washed by air or water. The particle sizes preferably should be such as to pass through an 8-mesh screen but be retained on a 32-mesh screen, thereby imparting to the finished product an advantageous proportion of voids. However, it will be apparent that other sizes of aggregates could be employed in certain modified embodiments that will be apparent to one skilled in the art from the following detailed description.

After washing, the aggregate is sprayed or dipped with a slurry (or ceramic slip) comprising clay which may be white or colored as desired in the following proportions: finely divided clay, ten to one hundred parts; flux such as nephaline syenite, feldspar or ground cullet, in the proportion of zero to seventy-five; talc, zero to sixty. The wide range in flux is applicable because some clays will not require any flux whereas others may require a substantial quantity. Although the above proportions may vary widely, depending upon the characteristics of the materials employed, one set of proportions which has proved advantageous is as follows: clay, forty-five parts; nephaline syenite, forty parts; talc, fifteen parts.

In order to deflocculate this slurry, it will be necessary in most cases to use approximately zero to one percent of sodium silicate and an equal amount of sodium carbonate, commonly called soda ash.

If it is desired to color the slurry in order to impart a particular color to a portion or all of the aggregate particles, this may be accomplished through the advantageous addition of suitable coloring material to the above. Such coloring materials may be selected from those well known in the ceramic arts and may include, for example, such as chrome oxide for green, cobalt oxide for blue, the oxides or other suitable compounds of iron and manganese, etc. In addition, any color such as pink, yellow, etc., may be obtained by adding to the above slurry materials currently marketed commercial stains which are well known in the art.

To the dry materials mentioned above, it will be necessary to add approximately twenty-five to seventy-five percent by weight of water. The most desirable specific gravity of the above-formed slurry should be in the range of 1.5 to 1.95.

After the slurry has been prepared as described above, the various ingredients having thoroughly mixed, it is suitably applied to the aggregate particles. This may be accomplished in any one of a variety of ways. However, among those deemed most advantageous are the application of the slurry by spraying while the particles are on a vibrating screen, the vibrating screen being employed to advantageously prevent sticking of the aggregate particles and to ensure an even and complete coating about the entire periphery of each of the particles. Other ways in which the slurry could be applied to the aggregate particles will be apparent to one skilled in the art. Such could, for example, include the direct spraying without employment of the vibrating screen in certain applications. As another example, a plurality of particles could be dipped as a batch in a slurry, then removed and broken apart by the utilization of suitable rollers.

After the slurry has been applied to the aggregate particles in a coating which may advantageously approximate one thirty-second of an inch, the coatings are dried on the aggregate particles to a suitable moisture content. Although the moisture content at which drying is terminated may vary depending upon the types of presses or other forms subsequently utilized, one moisture content which has been found suitable has been in the range lying between four and fifteen percent depending upon the composition of the slurry, the plasticity of the clay or other materials, and the pressure used in the forming machine. After the aggregate particles have thus been prepared, they may be conveyed to forming machines such as conventional dry-press-brick-type machines, concrete or cement block-forming machines, etc.

After the aggregate particles have been formed into the desired shapes, the shapes are transported by suitable conveyors to drying and firing devices well known in the art. These devices may take the form of both dryers and kilns, although it will be obvious to one skilled in the art that depending upon the choices made within the above-indicated ranges, only a kiln might be required. However, if the moisture content of the forms is high, employment of a pre-kiln dryer may offer an advantage in that through its use sufficient strength may be imparted to the forms to enable stacking within the kiln. In the event drying is contemplated, the shapes are transported by suitable conveyors to a vertical mangle-type dryer which heats them to temperatures lying in the range between 150 and 350 degrees Fahrenheit. Next, they are fired in a suitable kiln at a temperature lying in the range between 1350 and 2100 degrees Fahrenheit, depending upon the maturing point of the slurry utilized. After suitable firing, the forms may be removed from the kilns and accepted methods of selection administered.

The time and temperature of the kiln conditions will vary as mentioned above, depending upon the type of slurry employed. However, it will be of interest to note that in accordance with advantageous utilizations of slurries corresponding to that described above, and by suitably firing the material in the kiln, the water absorption of the finished product can be reduced below one percent, a fact which renders such finished material extremely advantageous in certain commercial applications. Thus, the finished product is practically impervious to water and resists moisture staining to a very high degree. Furthermore, where high load-bearing strengths are required, the low moisture absorption characteristic having a direct relation to the load-bearing strength of the material renders it possible for extremely high load-bearing strengths to be embodied in the finished product.

As mentioned above, several types of finished product may be advantageously formed by my methods. Thus, for example, if a pattern of mottled, salt-and-pepper, or other type of interspersed coloring were desired, it could be advantageously formed through the suitable mixing of aggregate particles which were theretofore prepared in accordance with the above description but individually coated with differently colored slurries. Thus, for example, one batch of aggregate material could be coated with one color slurry, another batch with another color, and so on for as many types of colored aggregates as were desired. Afterwards, they could be mixed in the desired proportions and when introduced to the forming machines they would be in such proportions as to result in the desired coloring appearance in the final product.

More specifically, if a salt-and-pepper type of coloring were desired, one batch of aggregate particles could be coated with a white slurry, another batch could be coated with a black slurry, and mixing equipment well known in the art could be suitably employed for mixing the white and black coated aggregates in the desired proportion before introduction to the forming machines. After the aggregates were mixed together, they would be formed and then processed in the manner heretofore described with respect to the homogeneously-coated product.

In yet another embodiment of the invention, one or more colored aggregates would be blended together and with small pellets of different material which would be comprised of substances similar to those described for the slurry but which would be formed as pellets when quantities of water much less than the twenty-five to seventy-five percent range heretofore given were added to the slurry powdered ingredients. Thus, for example, if the slurry powdered ingredients described above were mixed together in powdered form and the water then added in proportions ranging from five to fifteen percent, small balls would be formed and these small balls could be mixed together with the coated aggregates in the desired proportions before introduction to the presses in which they would be formed into the desired shapes.

Of course, it will be apparent that one or more batches of these pellets could be employed and could be variously colored to produce any desired pattern of effect. Furthermore, through the employment of the pellets in suitable proportions, a finished terroza or tile effect could be embodied within the finished product, thereby lending a surface which would be mottled or which would present in some instances a more beautiful and suitable surface finish.

It will now be apperent to one skilled in the art that by the advantageous utilization of the principles embodied in my invention, an extremely lightweight, moisture-resistant and decorative tile or brick may be produced in a wide range of colors and combinations theerof. Furthermore, it will be apparent that the load-bearing strength of the products may be made exceedingly high where such is desired.

While I have illustrated my invention by specific embodiments thereof, it will be apparent to one skilled in the art that other arrangements, adaptations and modifications could be employed without departing from the spirit or scope of the invention.

The terms and expressions I have used are terms of description and not of limitation, and there is no intention in the use thereof of excluding equivalents, but on the contrary it is my intention to include any and all equivalents, adaptations and modifications that can be employed without departing from the spirit and scope of the invention.

What is claimed is:

1. A multi-colored ceramic member comprising a first plurality of lightweight aggregate particles covered with a first colored slurry coating; a second plurality of lightweight aggregate particles covered with a different colored slurry coating; the major dry ingredients of said slurry coatings consisting essentially of clay in finely divided form, 100 parts, flux, 10 to 75 parts, talc, 5 to 25 parts; said first plurality and said second plurality being mixed together in substantially equal numbers and being selected from the class consisting of bloated clays and shales, said pluralities of aggregate particles being compressed together and being held together in rigid contiguous relationship by said slurry coatings when fired.

2. A multi-colored ceramic member comprising a first plurality of lightweight aggregate particles covered with a first colored slurry coating; a second plurality of lightweight aggregate particles covered with a different colored slurry coating; the dry ingredients of said slurry coatings consisting essentially of constituents in the following proportions, clay, 45 parts, flux selected from the group consisting of nephaline syenite, feldspar and ground cullet, 40 parts, talc, 15 parts, sodium silicate, one-half part, and sodium carbonate, one-half part; said first plurality and said second plurality being mixed together in substantially equal numbers and being selected from the class consisting of bloated clays and shales; said pluralities of aggregate particles being compressed together and being held together in rigid contiguous relationship by said slurry coatings when fired.

References Cited in the file of this patent

UNITED STATES PATENTS

| | | |
|---|---|---|
| 2,007,742 | Brown | July 9, 1935 |
| 2,388,060 | Hicks | Oct. 30, 1945 |
| 2,871,132 | Hummel | Jan. 27, 1959 |

FOREIGN PATENTS

| | | |
|---|---|---|
| 262,383 | Great Britain | Apr. 21, 1927 |
| 417,124 | Great Britain | Sept. 24, 1934 |